July 15, 1958  F. H. RUED  2,842,966
BALANCER FOR WATER WHEELS
Filed Dec. 16, 1952  2 Sheets-Sheet 1

INVENTOR
FRED H. RUED
BY
ATTORNEY

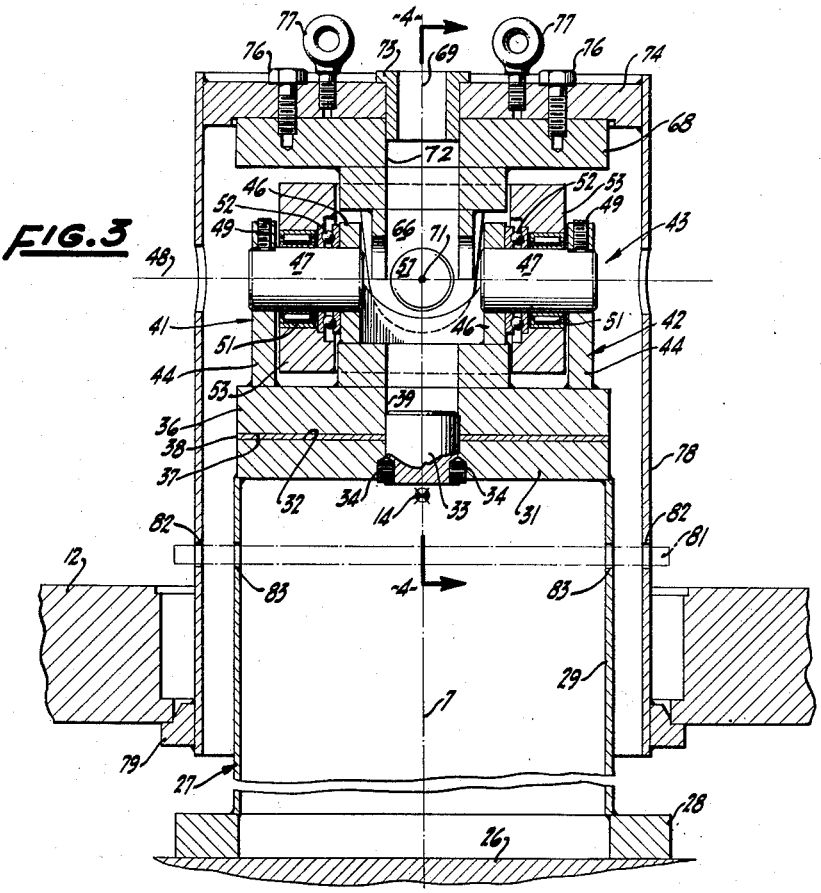
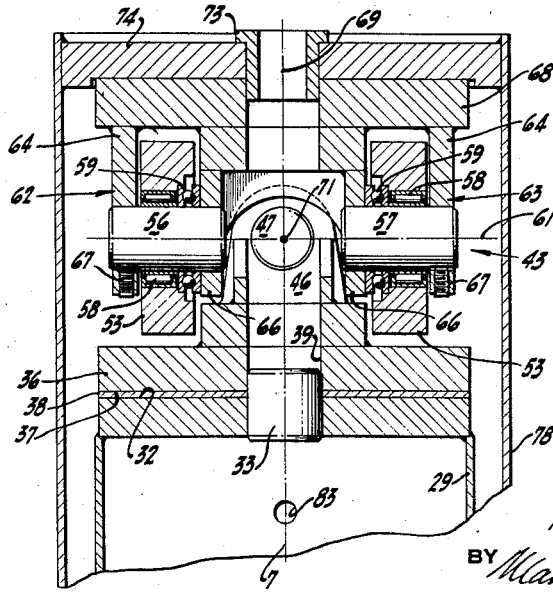

United States Patent Office 2,842,966
Patented July 15, 1958

2,842,966

BALANCER FOR WATER WHEELS

Fred H. Rued, Lafayette, Calif., assignor, by mesne assignments, to Baldwin-Lima-Hamilton Corporation, Philadelphia, Pa., a corporation of Pennsylvania Application December 16, 1952, Serial No. 326,210

6 Claims. (Cl. 73—474)

My invention relates to means for balancing, in the field if necessary, water wheels such as pump impellers and turbine runners of relatively large size, of the order of fourteen feet or so in diameter. The runner or rotor referred to as a water wheel herein, is usually an integral casting symmetrical about a rotational axis in theory. In practice, due to variations in the cast material and in some of the machining practices it is sometimes the case that the rotatable body is not exactly symmertical and is therefore somewhat unbalanced. The unbalance can show up either on a static test or upon rotation of the wheel in a dynamic test. Because of the size and weight of the rotor or water wheel it is often difficult to find a means for effectuating a dynamic balance of the wheel although that is virtually essential for satisfactory operation and for long life of the supporting bearings and attendant mechanism.

It is therefore an object of my invention to provide means for balancing a water wheel dynamically as well as statically.

Another object of the invention is to provide means for rotating a water wheel in connection with a balancing operation.

Another object of my invention is to provide a balancer for a water wheel which is of relatively small size and weight so that it can be utilized in the field, if necessary, and can be utilized in conjunction with virtually standard and readily available machinery.

A further object of the invention is in general to improve balancers for water wheels.

Other objects together with the foregoing are attained in the embodiment of the invention described in the accompanying description and illustrated in the accompanying drawings, in which Figure 1 is a side elevation of a balancer for a water wheel set up on a rotating table with the water wheel in position and with attendant measuring structure in position.

Figure 3 is a cross section on a vertical axial plane through the balancer of my invention, a part of the water wheel being shown but the remainder being broken away.

Figure 4 is a cross section like Figure 3 but taken on a plane perpendicular to the plane of Figure 3 and with additional parts of the structure being broken away.

Figure 1:
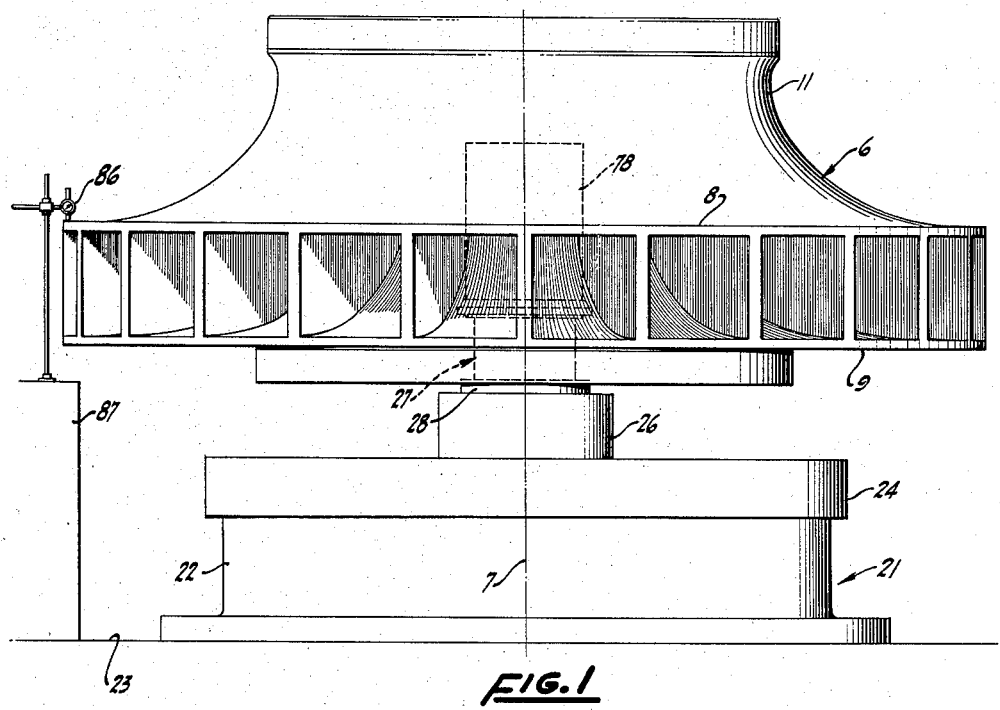
Figure 2:
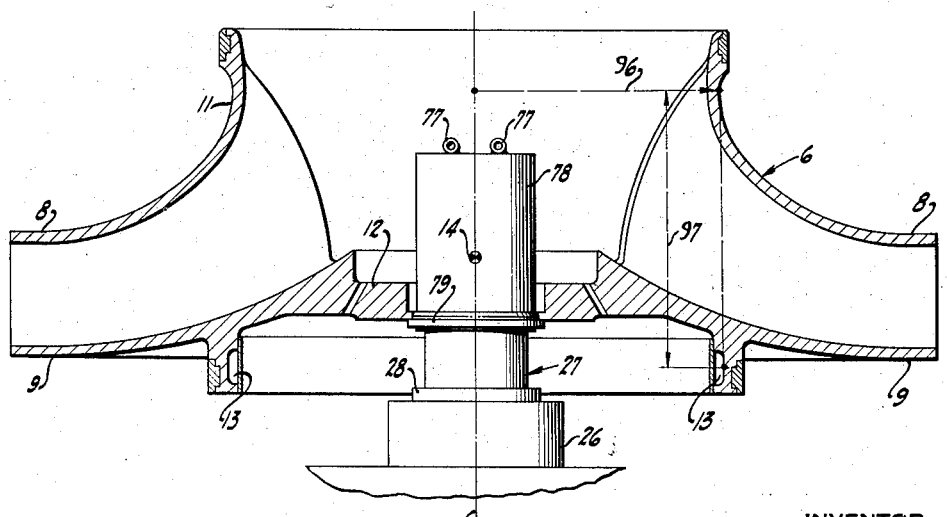
Figure 2 is a view to the same scale as Figure 1 but with parts broken away to reduce the size of the figure and with part of the water wheel shown in cross section on a vertical axial plane.

While the balancer of my invention is useful in connection with any sort of relatively large rotating body having a mounting hub, it is especially useful in connection with the balancing of water wheels, by which I refer to pump impellers and turbine runners and comparable rotary hydraulic devices. A representative shape of water wheel is shown in Figures 1 and 2 and includes a relatively large casting 6 which is symmetrical about a central axis 7 and has a pair of approximately parallel peripheral margins 8 and 9 and a runner band 11. Also, the water wheel includes a hub flange 12 forming part of the structure normally utilized to mount the water wheel on a supporting rotary shaft, not shown. In practice, the shaft can be either vertical or horizontal but for balancing purposes the axis 7 is always positioned in a generally vertical direction. The wheel 6 is likewise provided with a number of balancing pockets 13 at a convenient point, the general form and weight distribution of the water wheel being such that its center 14 of gravity is, as shown in Figures 2 and 3, at a point slightly above the flange 12 and ideally on the axis 7.

It is desired to have an arrangement so that the water wheel can be balanced in virtually any shop provided with the usual heavy machinery. There is used as part of the balancing mechanism a machine tool 21; for example, a vertical boring mill having a base 22 fixed to the floor 23 and having a rotary table 24 of a diameter comparable to that of the water wheel but usually considerably smaller. The turntable 24 is capable of rotational speeds up to say 15 revolutions per minute.

In accordance with my invention, I preferably mount on the table 24 a block 26 or other suitable support for a base 27 preferably including a ring 28 and a tubular shell 29 all symmetrical about the central axis 7. The block 26 and the base ring 28 can be fastened in any appropriate way onto the turntable 24 for rotation in unison therewith about the axis 7. The base 27 extends upwardly preferably to a point slightly above the approximate center of gravity 14 of the water wheel. A thrust plate 31 is secured in position on the shell 29 and has a planar thrust surface 32 perpendicular to the axis 7. The hub or base 27 also is provided with a stub shaft 33 centrally located and held in position by a pair of set bolts 34 so that the stub shaft serves as a locating guide. Journalled on the stub shaft is a thrust disc 36 having a thrust surface 37 thereon perpendicular to the axis 7 and abutting against the thrust surface 32. While it is satisfactory for the two surfaces 37 and 32 to abut directly it is deemed preferable to interpose an anti-friction member 38 between these thrust surfaces. The anti-friction member 38 can be a separate floating disc or it can be an anti-friction material affixed for rotation with either the thrust plate 31 or the thrust disc 36. In any case, the thrust disc 36 is provided with an internal bore 39 serving as a journal on the stub shaft 33 so that the thrust disc is located concentrically or coaxially with the axis 7 but is rotatable, if necessary, about the stub shaft 33 and relative to the thrust plate 31.

The thrust disc serves as a support for a first pair of bearing forks 41 and 42 forming part of a universal joint generally designated 43. The first pair of bearing forks 41 and 42 are substantially identical and are disposed symmetrically on opposite sides of the axis 7. The forks include upstanding outer plates 44 and upstanding inner plates 46 together supporting bearing pins 47 arranged coaxially on a transverse axis 48 intersecting the axis 7. The bearing pins 47 are driving pins and are locked in position by set screws 49 and serve to support radial bearings 51 and thrust bearings 52.

Carrying both the radial bearings 51 and the thrust bearings 52 is an annular ring 53 disposed substantially coaxial with the axis 7 and forming also a part of the universal joint 43. At right angles to the axis 48 and therefore at right angles to the pins 47 is another pair of pins 56 and 57 mounted in the ring 53 by means of radial bearings 58 and thrust bearings 59, a plane of the axis 61 of the pins 56 and 57 being in the same plane as the axis 48 and likewise intersecting the axis 7. Engaging the pins 56 and 57 which are driven pins is a second pair of bearing forks 62 and 63 each made up of outer plates 64 and inner plates 66, the pins 56 being secured by set screws 67 in the outer plates 64.

The second pair of bearing forks 62 and 63 are joined to a support disc 68 disposed so that its axis 69 always intersects the point of intersection of the axes 48, 61 and 7 and so that in one position of the universal joint it is coincident with or coaxial with the axis 7. The point 71 at which these various axes always intersect is disposed in a location so that the approximate center of gravity 14 of the water wheel is considerably below the point 71 and hence when the water wheel is in position it is in generally stable equilibrium. The support disc 68 is provided with a central bore 72 adapted to receive a centralizing thimble 73 for locating a hub plate 74 in proper centralized position. The hub plate 74 is secured to the support disc 68 by removable fastening bolts 76 and preferably removable lifting rings 77 are likewise engaged with the hub plate 74.

An external tubular hub casing 78 is affixed to the hub plate 74 and depends coaxially from it to overlie part of or virtually all of the base shell 29 or to extend sufficiently below the center of gravity 14 so that the assembly is in generally stable equilibrium. Around the hub casing 78 near the bottom thereof is a water wheel support 79 in the shape of a ring which is individually contoured to receive the flange 12 of the water wheel to be tested and balanced. The weight of the water wheel is sufficient so that it rests on the flange 79 in central location and rotates with the hub casing 78 without any fastening means. When this same weight is transmitted through the thrust disc 36 to the thrust plate 31 the interengaging surfaces 37 and 32, with or without the intervening member 38, are sufficiently loaded so that they transmit torque from one to the other and revolve in unison about the axis 7.

In the ordinary use of the structure and before the water wheel is positioned on the balancer, the balancer itself is placed on the turntable 24. This action is facilitated by the lifting rings 77 and in order to keep the base 27 from parting with the hub casing 78 there is provided a temporary pin 81 receivable in aligned apertures 82 in the hub casing 78 and also in similarly aligned apertures 83 in the base shell 29. A suitable device, such as a crane, engages the lifting rings 77 and with the pin 81 in position lifts the balancer and deposits it concentrically with the axis 7 on the block 26 and on the turntable 24. The pin 81, is then withdrawn so that the base 27 and the hub casing 78 are free to move relative to each other. The water wheel is then lowered into position over the balancer and with the flange 12 resting upon the support ring 79. Since the approximate center of gravity 14 of the water wheel is below the point 71 about which the universal joint can incline, the water wheel acts as a pendulum and comes to rest with its actual center of gravity near or on the axis 7. This may involve some tilting or inclination of the water wheel if it is not already in static balance.

The wheel is placed in static balance by the addition of suitable weights or by appropriate machining and is then rotated with the turntable 24 at a suitable speed, say 5 to 10 revolutions per minute. The universal joint mounting for the wheel permits an oscillation or inclination of the wheel as it revolves to serve as an indication of the location and amount of dynamic unbalance. For careful observation of the amount of wobble or vertical oscillation of the rotating wheel it is customary to provide a gauge 86 on a suitable stationary support 87 on the floor 23 so that as the wheel is rotated the gauge will afford readings of the amount of deviation of the rim 8 of the wheel from a plane or datum point. Observation will indicate the particular part of the rim 8 of the wheel which deviates either above or below a theoretical median plane. With this information it is possible to add or subtract weight from appropriate parts of the wheel to put it in satisfactory dynamic balance. Following that operation the wheel is readily lifted from the balancer, the holding pin 81 is reintroduced through the apertures 82 and 83 and the balancer is removed by use of the lifting hooks 77 from the turntable 24.

As an examplary procedure, with a water wheel having an impeller of about the diameter mentioned and of the general proportions and contours shown in the drawings, the procedure above described is followed. The water wheel is put in position on the balancer, it being assumed that the impeller has already been machined concentric with the axis 7 and that it is accurately centered on the turntable 24 with respect to the axis 7. The impeller then, unless by chance already in static balance, inclines to the horizontal. This inclination is corrected by adding trial balance weights in the pockets 13 to bring the impeller to substantially level condition. If desired, the turntable 24 can be rotated at a very slow speed, for example one half revolution per minute or less, to assist in the static balancing operation, although strictly speaking some very small dynamic forces are also involved.

As soon as an appropriate apparent static balance has been reached by this scheme, the impeller is lifted from the balancer a short distance, enough to remove the weight of the impeller from the support 79 and therefore from the disc 36 and the thrust plate 31, and the thrust disc with its attached parts is rotated one half revolution with respect to the thrust plate, this rotation being about the axis 7, about the stub shaft 33 as a journal, and with the surfaces 37 and 38 revolving relative to each other. The rotation of the disc 36 is not only with respect to the thrust plate 31 and the shell 29 but is also with respect to the temporarily suspended impeller. The purpose of this half rotation is to cancel any imperfections in symmetry in the balancer itself. The impeller or water wheel is then returned to its lower position on the balancer. Additional balancing weights are then added in the pockets 13 at appropriate points, if necessary, to rectify any then appearing deviations from level. The weight just added is then reduced to one half its previous value and is temporarily fastened in the same position or positions as before. It is solely for the purpose of compensating for unbalance in the balancer itself and is removed after the impeller is finally balanced. Other weights may be added after the half-rotation to bring the impeller to level position. Except for the one half turn rotation of the balancer top relative to the balancer base and relative to the impeller during the static balancing procedure, neither the impeller nor the balancer parts are subsequently rotated relative to each other.

The dynamic balancing of the impeller proceeds by rotation of the turntable 24, the balancer and the impeller in unison at a satisfactory speed. This depends on the amount of unbalance initially encountered. In a normal case five revolutions per minute will probably be satisfactory to indicate some unbalance or wobble. If the wheel happens to be nearly in dynamic balance, the speed can be increased to say ten revolutions per minute in order to aggravate the apparent unbalance or wobble.

The dynamic couple for a particular speed tending to produce a peripheral or marginal deflection of the wheel at the point 8 can be determined as follows:

S is equal to the vertical distance between the center of gravity 14 and the center 71 of the universal joint in inches.

R is the outside radius of the impeller in inches.

W equals the weight of the impeller in pounds.

T is the displacement of an indicator, such as the dial indicator 86, with reference to a zero or level position in thousandths of an inch.

2T is equal to the total wobble of the impeller at its outer diameter, for example at the surface 8.

K is a factor to establish the radial distance of the center of gravity of one half the impeller, in terms of R. (This need be determined only approximately.)

Dynamic couple equals the restoring couple due to gravity plus the restoring couple due to centers of gravity of the halves of the impeller on diametrically opposite sides being displaced from a datum plane of rotation minus the couple due to the center of gravity of the impeller being displaced from the center line of rotation.

The dynamic couple is equal to $$\left[W\frac{S}{R}\frac{T}{1000}\right]+\left[.000028\left(2\times\frac{W}{2}\right)\left(\frac{KR}{R}\times\frac{T}{1000}\right)(KR)N^2\right]-\left[.000028WS\frac{S}{R}\frac{T}{1000}N^2\right]=$$

$$\left[.001W\frac{S}{R}T\right]+\left[.000,000,028\left(K^2R-\frac{S^2}{R}\right)WTN^2\right]$$

The corrective couple required to offset the dynamic unbalance is established by trial weights positioned appropriately to compensate for the unbalance couple shown by wobble or departure from level by the impeller when it is rotating. Lack of wobble indicates dynamic balance. A formula for establishing the amount of trial weight and its location is as follows:

X equals weight of trial balancing weight on the impeller band adjacent the location 11 and measured in pounds.

Y is equal to the distance between the weight of the trial balancing weight adjacent the location 11 and the balancing pockets 13 measured parallel to the axis of rotation 7 and expressed in inches.

Z is equal to the radius from the axis of rotation 7 to the location of the weight adjacent the reference location 11 and measured in inches.

N is equal to the revolutions per minute.

For example, it can be assumed that there is an unbalanced dynamic couple of 100 inch pounds. The trial weight is to be added to the impeller adjacent the location 11 and the impeller is to be turned with the turntable 24 at 10 R. P. M. The radius 96 of the portion 11 of the impeller in the example stated is approximately 46 inches and the portion 11 is at an axial distance 97 from the center line of the balancing pockets 13 of approximately 50 inches in the example shown. Then, $$\text{Correction Couple}=\frac{X}{32.2}\times Y\times\frac{Z}{12}\times(.104N)^2 \text{ inch pounds}$$

$$=.000028XYZN^2$$

$$X=\frac{\text{Correction Couple}}{.000028YZN^2}=\frac{35700\times\text{Correction Couple}}{YZN^2}$$

A trial weight of the indicated value is then put in position on the portion 11 of the impeller and in a selected polar location. This selected location is the highpoint of the rim 8, which has conveniently been marked by chalk during previous rotation. The impeller is rebalanced statically by the addition of weights in the pocket 13 and with the trial weight still in position in the selected location and the impeller is then rotated at a moderately high speed to determine whether or not there is any remaining dynamic unbalance. The trial weight can either be left in position or, if the circumstances do not justify such a step, material is removed by machining at the opposite point on the impeller at substantially the same elevation. Finally when the static and dynamic balance appear to be proper, the corrective weight for compensating for the balancer unbalance is removed and the dynamically balanced impeller is ready for use.

What is claimed is:

1. A balancer for a water wheel comprising a table rotatable about a vertical axis, a base coaxially disposed on said table for rotation therewith and having a thrust surface perpendicular to said axis, a stub shaft coaxially disposed on said base, a thrust disc journalled on said stub shaft and abutting said thrust surface, a universal joint having two pairs of bearing forks, one pair of said bearing forks being disposed on said thrust disc symmetrically with respect to said axis, a support disc secured to the other pair of said bearing forks, a hub plate secured to said support disc, a hub casing secured to said hub plate and encompassing said base, and a water wheel support on said hub casing.

2. A balancer for a water wheel comprising a table rotatable about a vertical axis, a base coaxially disposed on said table for rotation in unison therewith, a universal joint having two pairs of bearing pins with the coplanar axes of said pairs intersecting at a point, means for mounting one of said pairs of bearing pins of said universal joint on said base with said point on said vertical axis and with the axis of said one of said pairs of bearing pins normal to said vertical axis for rotation of said joint relative to said base and relative to said table about said axis, means for transmitting torque from said base to said universal joint without relative rotation between said base and said universal joint, and means mounted on the other one of said pairs of bearing pins of said universal joint for supporting a water wheel for rotation with said universal joint about said axis.

3. A balancer for a water wheel comprising a base adapted to be disposed on a rotatable table for rotation in unison therewith about a vertical axis, a thrust plate secured to said base for motion therewith and having a top surface perpendicular to said axis, a thrust disc having a bottom surface perpendicular to said axis and in frictional but separable abutment with said top surface, said thrust disc being solely supported on said thrust plate by said abutment of said surfaces for frictional driving thereby, means for guiding said thrust disc for rotation relative to said thrust plate about said axis, a universal joint having two pairs of bearing pins, means for securing one of said pair of bearing pins on said thrust disc for motion therewith about said axis, a support disc, means for securing said support disc to the other of said pair of bearing pins for motion therewith, a hub casing surrounding part of said base, means for securing said hub casing on said support disc for motion therewith, and means on said hub casing for supporting a water wheel.

4. A balancer for a water wheel comprising a tubular base symmetrical with and rotatable about a vertical axis, means mounting said base for rotation about said axis, a plate vertically supported on said base solely by frictionally but removably resting thereupon for frictional driving thereby, means for guiding said plate to rotate relative to said base about said axis, a universal joint having two pairs of pins, means for connecting one of said pairs of pins rigidly to said plate with the center of said joint on said axis, a tubular hub casing, means for connecting the other of said pairs of pins rigidly to and centrally of said hub casing, and means on said hub casing for supporting a water wheel.

5. A balancer for a water wheel comprising a base symmetrical about an axis, means for supporting and rotating said base about said axis, a thrust plate secured to said base for motion therewith and having an upper surface perpendicular to said axis, a thrust disc solely supported on and rotatable relative to said base about said axis and having a lower surface perpendicular to said axis and in frictional driving abutment with said upper surface for frictional driving thereby, a universal joint having two pairs of pins, means for securing said one of said pairs of pins to said thrust disc for motion therewith, means for centralizing said universal joint with the center thereof coincident with said axis, a support disc secured to the other of said pairs of pins for motion therewith, a hub casing secured to said support disc for motion therewith and surrounding said base and coaxial therewith in one position of said universal joint, and means on said hub casing for supporting a water wheel.

6. A balancer comprising a base symmetrical with and rotatable about a vertical axis, a universal joint having a driving pair of pins and a driven pair of pins, means for supporting the weight of an article to be balanced on said driven pair of pins, and means for transferring said weight from said driving pair of pins to said base with the intersection of the axes of said pairs of pins coincident with said vertical axis, said transferring means including elements having upper and lower planar friction surfaces and including means for constraining said lower friction surface solely to rotation with said base about said vertical axis and including means for constraining said upper friction surface to rotation about said vertical axis and to motion along said vertical axis, whereby said weight presses said upper friction surface downwardly against said lower friction surface and into frictional rotary driving engagement therewith.

References Cited in the file of this patent

UNITED STATES PATENTS

| | | |
|---|---|---|
| 915,718 | Bassett | Mar. 16, 1909 |
| 1,091,708 | Riddell | Mar. 31, 1914 |
| 2,127,950 | Bennett | Aug. 23, 1938 |
| 2,502,633 | Shepard | Apr. 4, 1950 |

FOREIGN PATENTS

| | | |
|---|---|---|
| 114,195 | Great Britain | Mar. 21, 1918 |